United States Patent

Miller et al.

[11] Patent Number: 5,981,911
[45] Date of Patent: Nov. 9, 1999

[54] METHOD FOR HEATING THE SURFACE OF A FOOD RECEPTACLE

[75] Inventors: Charles G. Miller, Branford, Conn.; John A. Rolls, Armonk, N.Y.

[73] Assignee: Thermicon Systems International, Stratford, Conn.

[21] Appl. No.: 08/635,068

[22] Filed: Apr. 19, 1996

[51] Int. Cl.$^6$ .............................. H05B 3/36; A21B 1/52
[52] U.S. Cl. ...................... 219/387; 219/528; 219/544; 219/545; 219/549
[58] Field of Search ..................... 219/213, 544, 219/528–529, 548–549, 543, 385–387; 338/255–257, 262, 292, 308; 404/71, 79

[56] References Cited

U.S. PATENT DOCUMENTS

| | | | |
|---|---|---|---|
| 2,482,665 | 9/1949 | Geyer | 219/529 |
| 2,603,740 | 7/1952 | Del Buttero | 219/385 |
| 3,191,004 | 6/1965 | Hocker | 219/438 |
| 3,374,338 | 3/1968 | Morey | 219/529 |
| 3,484,585 | 12/1969 | Morey | 219/529 |
| 3,505,498 | 4/1970 | Shevlin | 219/438 |
| 3,573,430 | 4/1971 | Eisler | 219/385 |
| 3,598,961 | 8/1971 | Hager, Jr. | 219/438 |
| 3,657,516 | 4/1972 | Fujihara . | |
| 3,697,728 | 10/1972 | Stirzenbecher | 219/548 |
| 3,721,803 | 3/1973 | DiStefano | 219/387 |
| 3,725,645 | 4/1973 | Shevlin | 219/387 |
| 3,818,180 | 6/1974 | Orosio . | |
| 3,859,504 | 1/1975 | Motokawa et al. . | |
| 3,869,596 | 3/1975 | Howie | 219/438 |
| 4,039,720 | 8/1977 | Cherenko et al. . | |
| 4,063,068 | 12/1977 | Johnson et al. | 219/441 |
| 4,110,151 | 8/1978 | Morse . | |
| 4,134,004 | 1/1979 | Anderson et al. | 392/432 |
| 4,245,149 | 1/1981 | Fairlie . | |
| 4,250,397 | 2/1981 | Grey et al. . | |
| 4,282,049 | 8/1981 | Morse . | |
| 4,517,446 | 5/1985 | Torning . | |
| 4,534,886 | 8/1985 | Kraus et al. . | |
| 4,575,928 | 3/1986 | Starnes | 29/611 |
| 4,734,231 | 3/1988 | Morita et al. . | |
| 4,737,618 | 4/1988 | Barbier et al. . | |
| 4,794,228 | 12/1988 | Braun, Jr. . | |
| 4,806,736 | 2/1989 | Schirico | 219/386 |
| 4,816,646 | 3/1989 | Solomon et al. | 219/387 |
| 4,916,290 | 4/1990 | Hawkins | 219/385 |
| 4,933,534 | 6/1990 | Cunningham . | |
| 4,942,078 | 7/1990 | Newman et al. . | |
| 4,972,197 | 11/1990 | McCauley et al. | 343/704 |
| 5,128,522 | 7/1992 | Marx et al. | 219/385 |
| 5,250,228 | 10/1993 | Bairgrie et al. . | |
| 5,274,215 | 12/1993 | Jackson | 219/439 |
| 5,344,696 | 9/1994 | Hastings et al. | 219/548 |
| 5,361,183 | 11/1994 | Wiese . | |
| 5,497,883 | 3/1996 | Monetti | 206/545 |
| 5,557,704 | 9/1996 | Dennis et al. | 392/480 |

FOREIGN PATENT DOCUMENTS

| | | |
|---|---|---|
| 496388 | 7/1992 | European Pat. Off. . |
| 2004345 | 11/1969 | France . |
| 2283618 | 3/1976 | France . |
| 2493090 | 4/1982 | France . |
| 0416952 | 8/1925 | Germany . |
| 4221455 | 1/1994 | Germany . |
| 55-166892 | 12/1980 | Japan . |
| 6-297632 | 10/1994 | Japan . |
| 7-302683 | 11/1995 | Japan . |
| 8505528 | 12/1985 | WIPO . |
| 9515670 | 6/1995 | WIPO . |

*Primary Examiner*—Joseph Pelham
*Attorney, Agent, or Firm*—White & Case, LLP

[57] ABSTRACT

A method is provided for heating the surface of a food receptacle to heat the food contained therein. The method comprises, providing a laminated composite heater element, impermeable to water. The heater element is disposed on the surface of the food receptacle and is heated at prescribed intervals and temperatures effective to heat the receptacle surface and thereby heating the food contained therein.

8 Claims, 6 Drawing Sheets

METHOD FOR HEATING THE SURFACE OF A FOOD RECEPTACLE

BACKGROUND OF THE INVENTION

1. Field of the Invention

The present invention relates generally to methods of heating various surfaces by a heater element. Specifically, the invention relates to a method for heating the surface of a food receptacle to heat the food contained therein.

2. Description of the Prior Art

A variety of methods for heating surfaces through the use of heater elements exist in the prior art. U.S. Pat. No. 4,534,886, to Kraus et al., discloses an electrically conductive web composed of a non-woven sheet of conductive fibers and non-conductive fibers. The sheet is saturated with a dispersion containing conductive particles and dried. The Kraus et al. heater element is primarily used in heating pads.

International Application No. PCT/US94/13504 (Publication No. WO95/15670), discloses an electrically conductive composite heating assembly that has an electrically conductive non-woven fiber layer laminated between layers of fiberglass and other dielectric material and has an abrasion resistant outer layer. The heater element is used in aerospace structures as an ice protection system to withstand repeated mechanical stress and thermal cycles in extremely harsh aerospace environments.

U.S. Pat. No. 5,344,696 to Hastings et al. discloses an integrally bonded laminate which is used to thermally control a surface or portion of a surface of an aircraft to which the laminate is bonded.

None of the prior art heater elements, however, have been successfully applied to the surface of a food receptacle to heat the food contained therein.

SUMMARY OF THE INVENTION

The present invention comprises a method of heating the surface of a food receptacle to heat the food contained therein. The method comprises providing a heater element; disposing the heater element on the interior or exterior surface of the receptacle, and energizing the element at prescribed intervals and temperatures, which are effective to heat the surfaces of the receptacle, and thereby heating the food therein.

DETAILED DESCRIPTION OF THE PREFERRED EMBODIMENT

The method of the invention comprises, providing a heater element to a food receptacle; disposing the heater element to a food receptacle, disposing the heater element on the surfaces of the receptable, and energizing the heater element at prescribed intervals and temperatures which are effective to heat the surface of the receptacle and the food contained therein.

The heater element of the present invention is a laminated composite heater element, impermeable to water, and is of the type disclosed in U.S. Pat. No. 5,344,696 (Hastings et al.), which is incorporated herein by reference. As disclosed in the Hastings et al. patent, the heater element comprises a durable outer ply, which is resistant to abrasion and impermeable to water, bonded to and through a conductive layer of fibers, and an integrally enveloping adhesive, which is adhered to the surface of the vessel. The conductive layer is connected to a source of electrical energy, and control means are adapted to control the temperature of the surface of the vessel. This laminated structure is considered preferable; however, it is contemplated that other structures may be used. For example, the heater element need not be a laminated structure. Rather, the heater element may comprise merely a layer of conductive fibers. This structure of the heater element is particularly useful if the material into which the heater element is embedded has dielectric properties that will evenly distribute the heat generated by the element.

In one embodiment of the invention, the preferred heater element is manufactured under the trademark Thermion™ by Aerospace Safety Technologies, Inc. Thermion™ is light, flexible and may be translucent. The material is a laminated composite which provides even heating and can be conformed to surfaces having a variety of different contours and shapes. Operational power can be derived from low or high voltage AC or DC power supplies.

Figure 1:
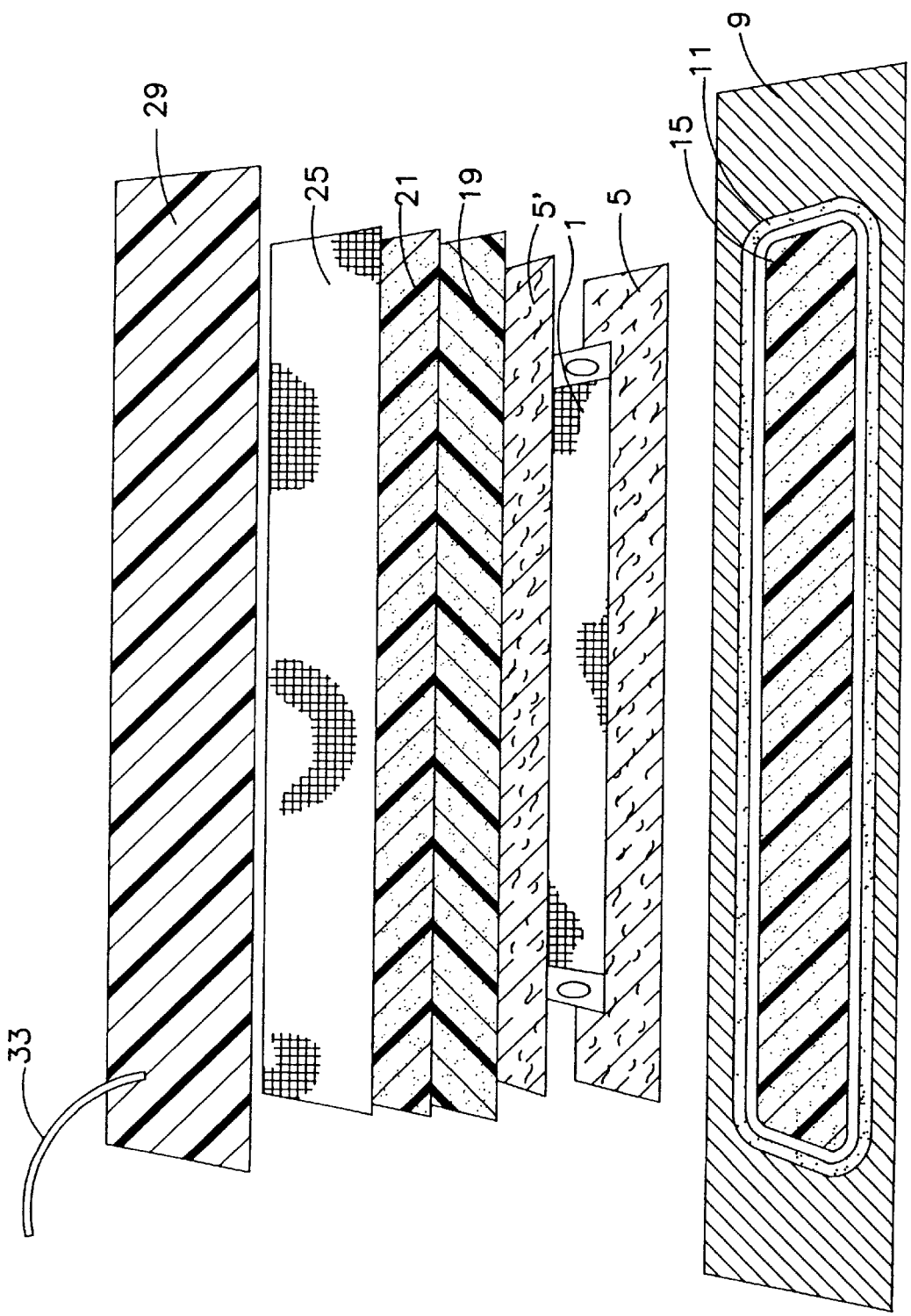
FIG. 1 depicts the construction of a composite heater element of the invention in a mold.

A first variation in the method involves installing on the interior or exterior surface of the receptacle a pre-made panel, usually configured on a mold table for easy transfer to the final surface. As shown in FIG. 1, the pre-made panel comprises a fiberglass/resin encapsulated heater element 1, further encapsulated in two fiberglass/resin cloths 5 and 5'. The pre-made panel also contains electrical leads (not shown), which extend outside the panel, and are connected to a power supply (not shown). The laminate can be constructed with one or more layers of the fiberglass/resin encapsulated heater element 1. A multiple-layered heater element can provide greater control over the heat output from the assembly.

FIG. 1 shows how a single layer pre-made panel is formed on a transfer table. The fiberglass/resin encapsulated heater element 1 is placed on top of a mold table surface 9. A mold release wax 15 is disposed between the encapsulated heater element 1 and the table surface 9. A peel ply 19 is placed above the encapsulated heater element 1. A release ply 21 is disposed above the peel ply 19 and a bleeder cloth 25 is disposed over the release ply 21. Finally, a vacuum bag 29 is disposed over the release ply 21. A seal tape 11 surrounding the layers on the mold is attached to the table top surface 9, and can adhere to the vacuum bag 29 to create a tight seal. A vacuum supply 33 is used to evacuate the air between the layered material in order to bring the layers into close opposition with each other and cure the resin, bonding the layers to create the laminate.

In another embodiment, the heater element may comprise merely a layer of conductive fibers and may be directly embedded into a surface of the receptacle. However, the surface material of the receptacle must possess sufficient properties to evenly distribute the heat generated by the heater element to the surface of the material and to maintain that heat over an extended period of time. Thermoplastic materials possess dielectric properties and are materials suitable for use in the invention.

The heater element is disposed on part or all of the interior or exterior surface of the food receptacle. The heater is then energized at prescribed intervals and to prescribed temperatures effective to heat the food contained within the receptacle. The heater is preferably used to maintain the temperature of food which has already been heated; however, it is envisioned that the heater may also be used to cook food and to reheat food. The location of the heater may vary according to the particular material and type of heating required.

As stated, in the preferred embodiment the heater is used to maintain the temperature of preheated food, i.e., in food service requiring low to medium temperatures. Low temperatures are those mainly used to keep food warm for serving purposes. Medium temperatures are conditions necessary for hot beverages, steam baths, or similar foods. The heating element is excellent for keeping food warm in transport ovens, better known as "warmers." Heating is constant within the unit thus eliminating hot and cold spots which arise in the single location heaters presently used in the art.

Figure 2:
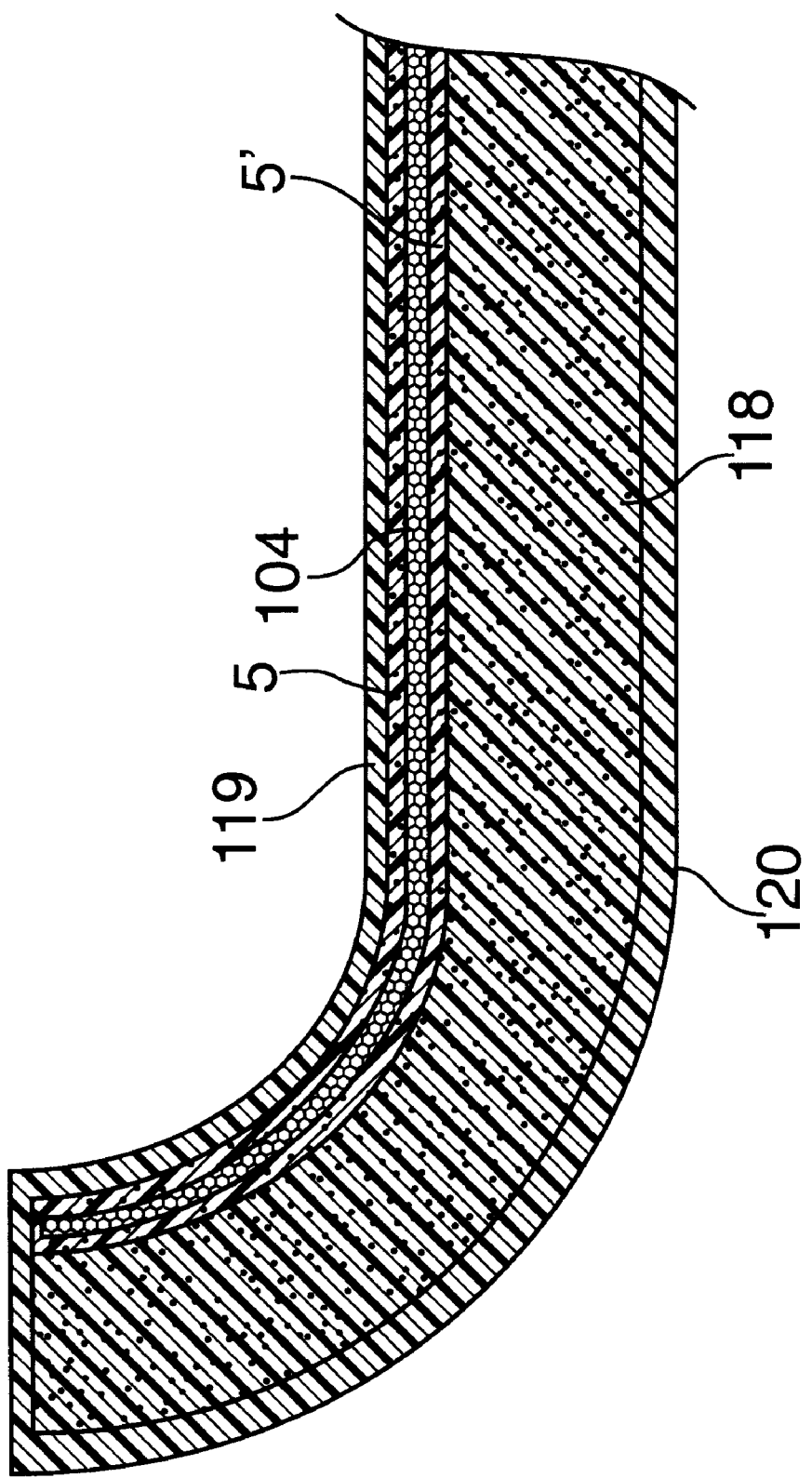
FIG. 2 depicts an example of a heating foam inlaid warmer of the invention.
Figure 3A:
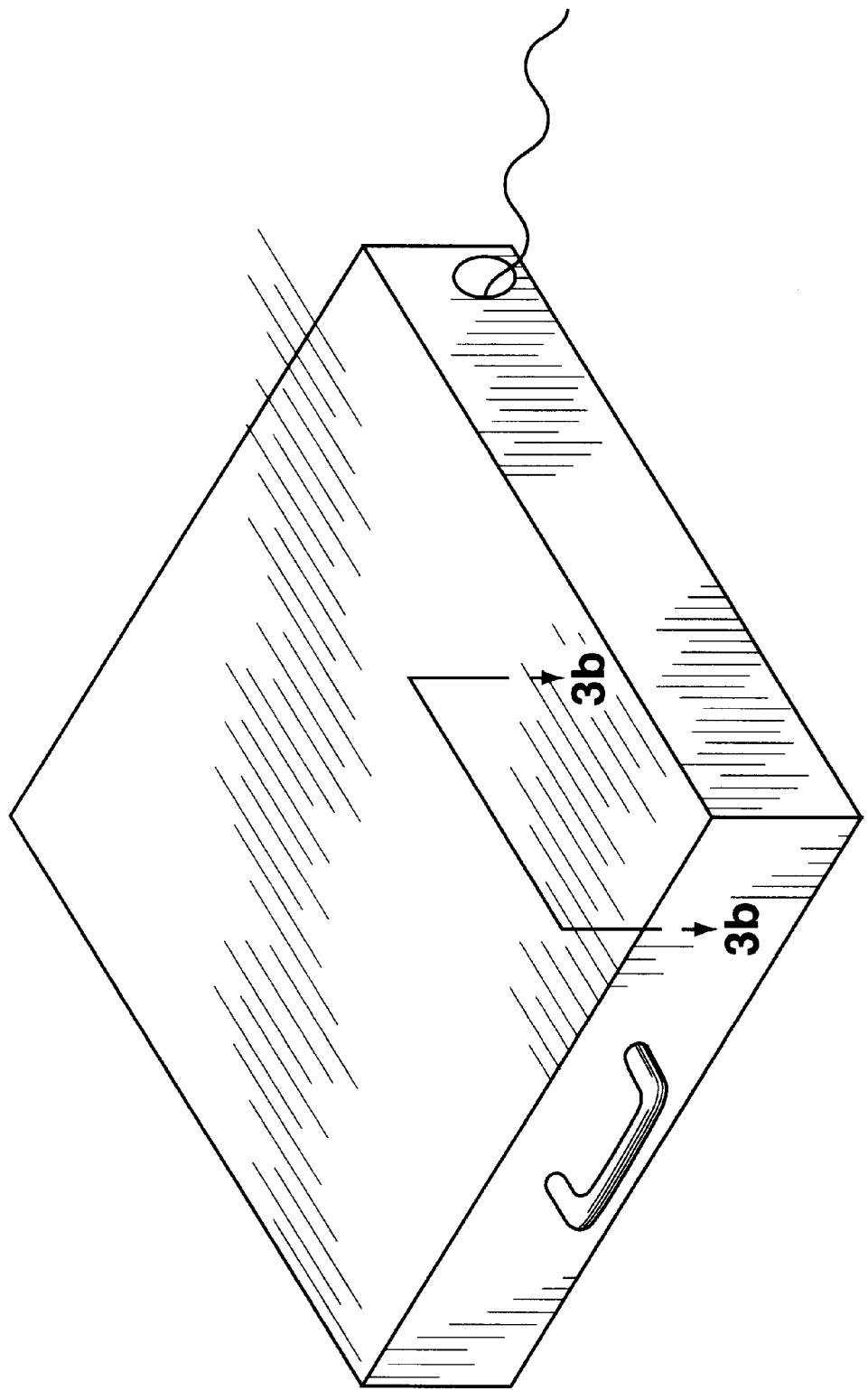
FIG. 3A depicts a foam inlaid warmer of the invention showing electrical leads and a power source. 3B is a cross-section through the walls of the warmer showing the placement of the heater element 104 and a lead for connecting to a power supply.
Figure 3B:
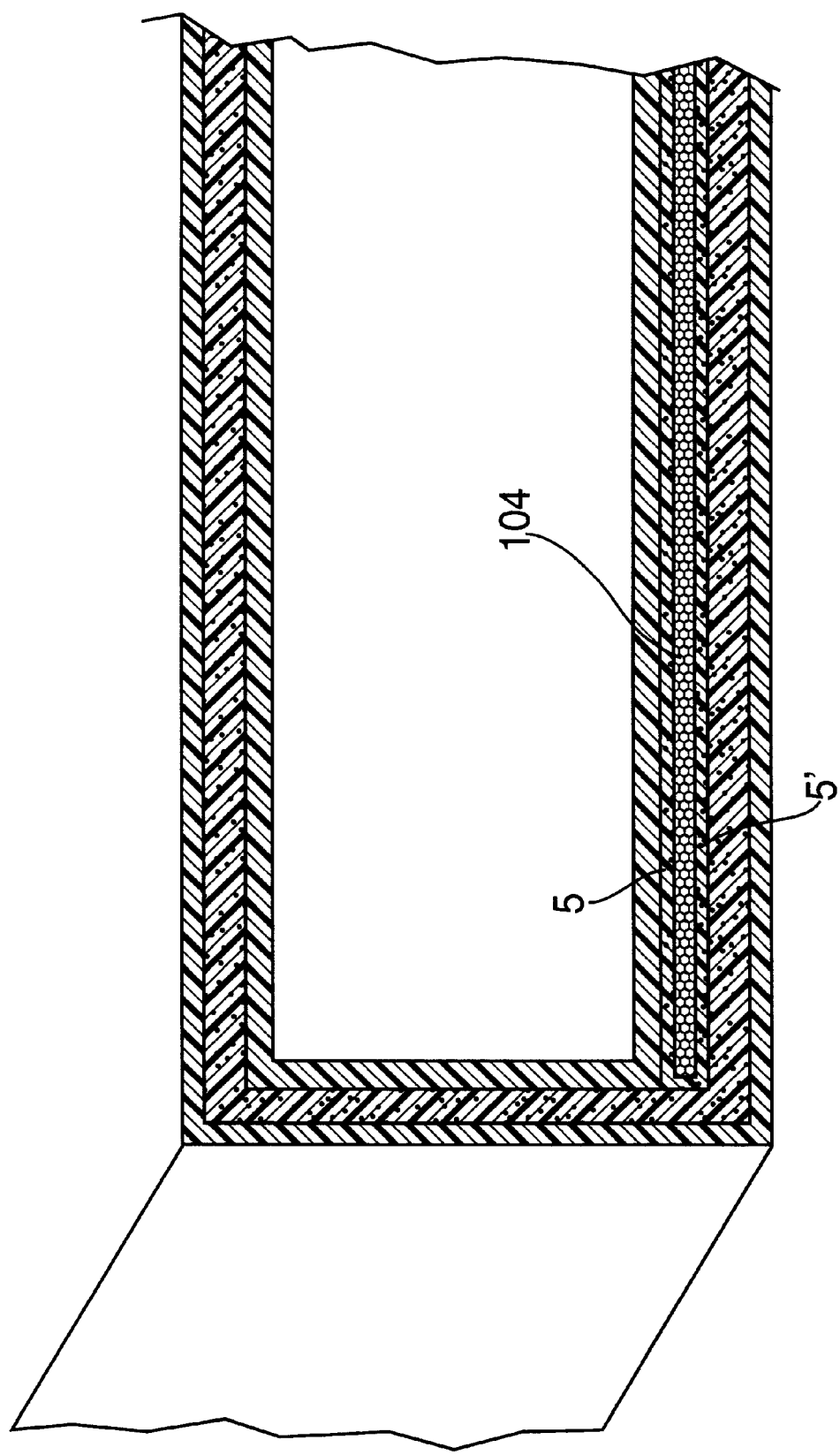

FIG. 2 depicts one embodiment contemplated by the invention, which is a foam inlaid warmer useful as a heating accessory. The heater element 104 is inlaid within a foam core 118 and disposed near to an inner skin layer 119 of the structure or vessel. An outer skin 120 is further disposed on the outer surface of the foam core 118. A foam inlaid food receptacle warmer of the invention is shown in FIG. 3A and 3B. The receptacle contains the heater element 104 which can be connected to either an AC or a DC power source 10.

Figure 4A:
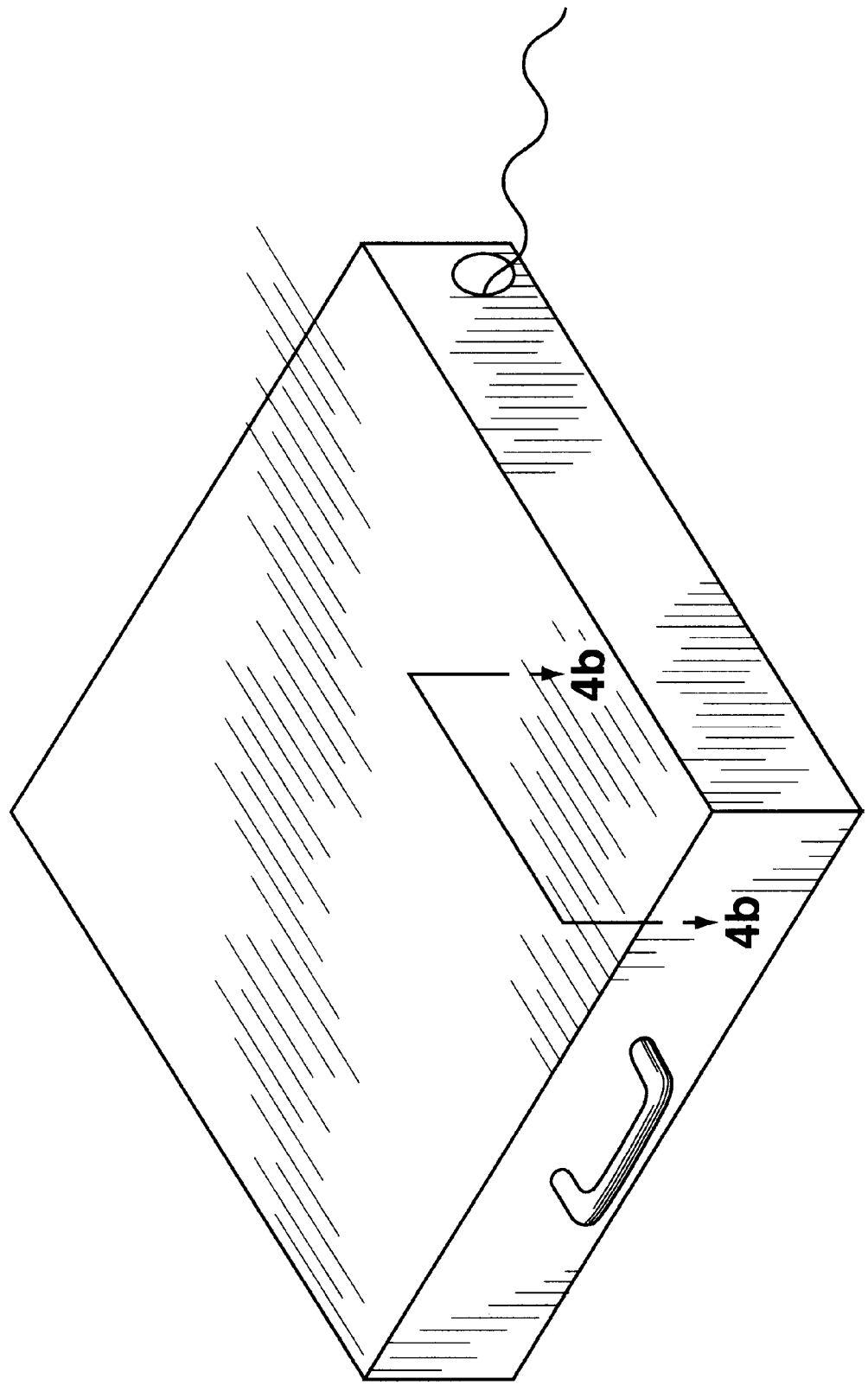
FIG. 4A shows a pizza delivery system of the invention. 4B is a cross-section through the walls of the pizza bag showing the heater disposed on the exterior surface.
Figure 4B:
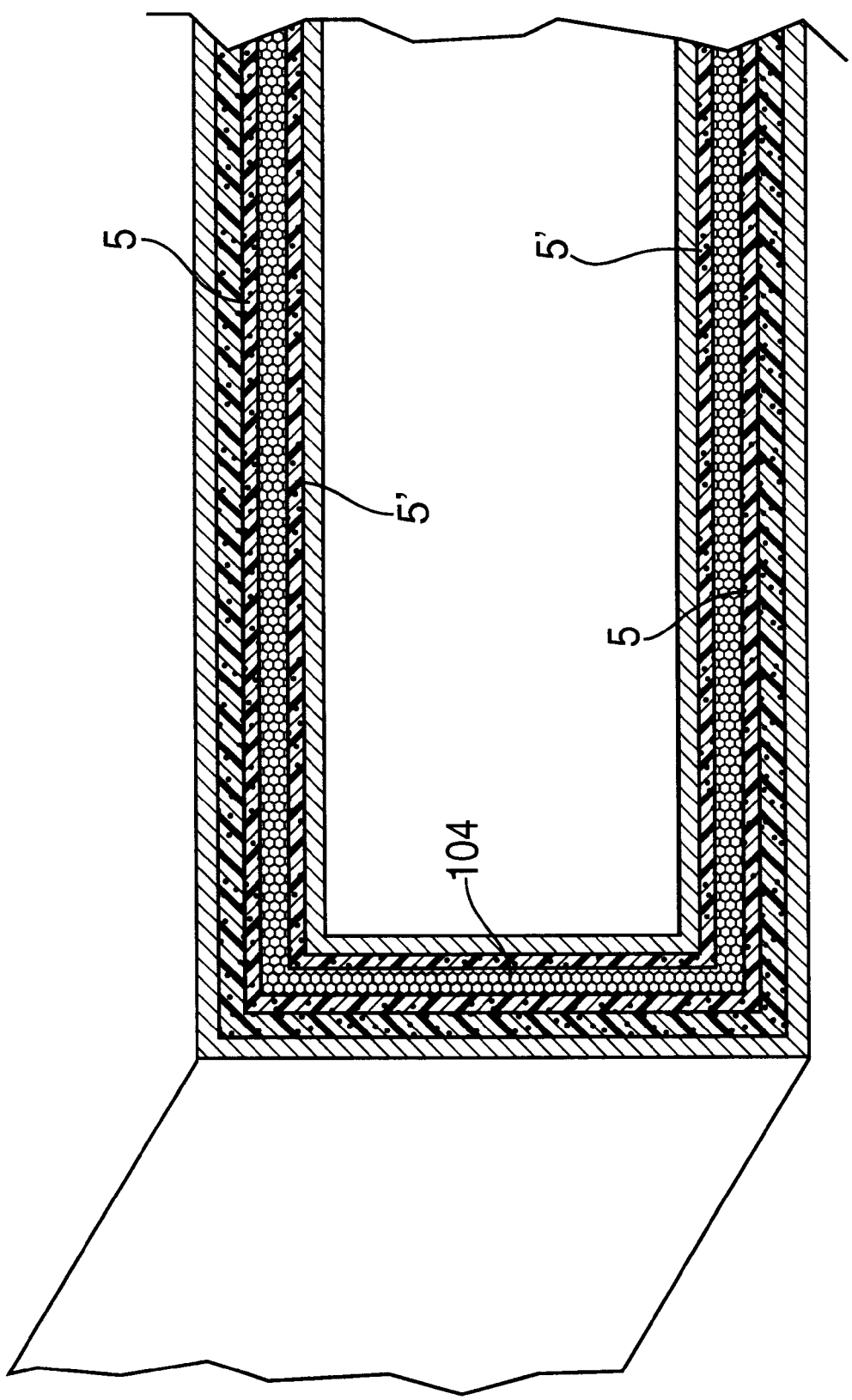

The warmer could be pressure formed plastic with foam insulation or a general stainless steel, insulated unit. In the case of the plastic units, encapsulation in the foam or plastic is possible as well as formed-in-place designs. Formed-in-place installations would take place on either side of the inner liner; this includes stainless steel units. The heater may also be a pre-formed panel which can be bonded to the surfaces. An example of such a warmer is a pizza delivery warmer powered by the automobile's 12 volt electrical system, as shown in FIG. 4A and 4B. These units could be small enough to ride in the passenger seat and plug into the cigarette lighter, or large and fit into a truck/van bed with suitable wiring.

Other installations include coffee urns, table warmers for items like pizza, chaffing dishes, and food service carts such as those used in transport systems, for example, airplanes and trains. Methods for heating hot water heating cans, and coffee cup warmers are also contemplated by the invention.

What is claimed is:

1. A method for heating the surface of a food receptacle to heat food contained therein, comprising:

providing a pre-formed panel heater element consisting of: an inner layer composed of a fabric of electrically conductive fibers encapsulated between two fiberglass/resin layers; two outer fiberglass/resin layers disposed on opposing surfaces of said inner layer and encapsulating said inner layer, and electrical leads connected to said conductive fibers and adapted to receive power from a power source, disposing the pre-formed panel heater element at a predetermined depth from the surface of the receptacle;

connecting the electrical leads of the preformed panel heater to a power source; and energizing the conductive fibers of the pre-formed panel heater element to distribute heat evenly on the surface of the receptacle and thereby heat the food contained within the receptacle.

2. The method of claim 1, wherein the pre-formed panel heater element is provided in the form of a laminated composite.

3. The method of claim 1, wherein the food receptacle is a pizza delivery warmer.

4. The method of claim 1, wherein the food receptacle is an airplane or train food service cart.

5. The method of claim 1, wherein the food receptacle is a coffee urn.

6. The method of claim 1, wherein the food receptacle is a chaffing dish.

7. The method of claim 1, wherein the food receptacle is a table warmer.

8. The method of claim 1, wherein the food receptacle is a foam inlaid warmer.

* * * * *

UNITED STATES PATENT AND TRADEMARK OFFICE
CERTIFICATE OF CORRECTION

PATENT NO. : 5,981,911
DATED : November 9, 1999
INVENTOR(S) : Miller et al.

It is certified that error appears in the above-identified patent and that said Letters Patent is hereby corrected as shown below:

On the face of the patent, under "[75] Inventors:" after "N.Y.," add --Otis H. Hastings, Mahwah, N.J.--, and under "[73] Assignee:" change "Thermicon" to --Thermion--.

Signed and Sealed this

Twenty-fifth Day of July, 2000

Attest:

Attesting Officer

Q. TODD DICKINSON
Director of Patents and Trademarks